8212 OR 3,010,362
250/201
252
858168
Nov. 28, 1961 D. L. SMITH 3,010,362
AUTOMATIC LIGHT CONTROL
Filed Dec. 8, 1959
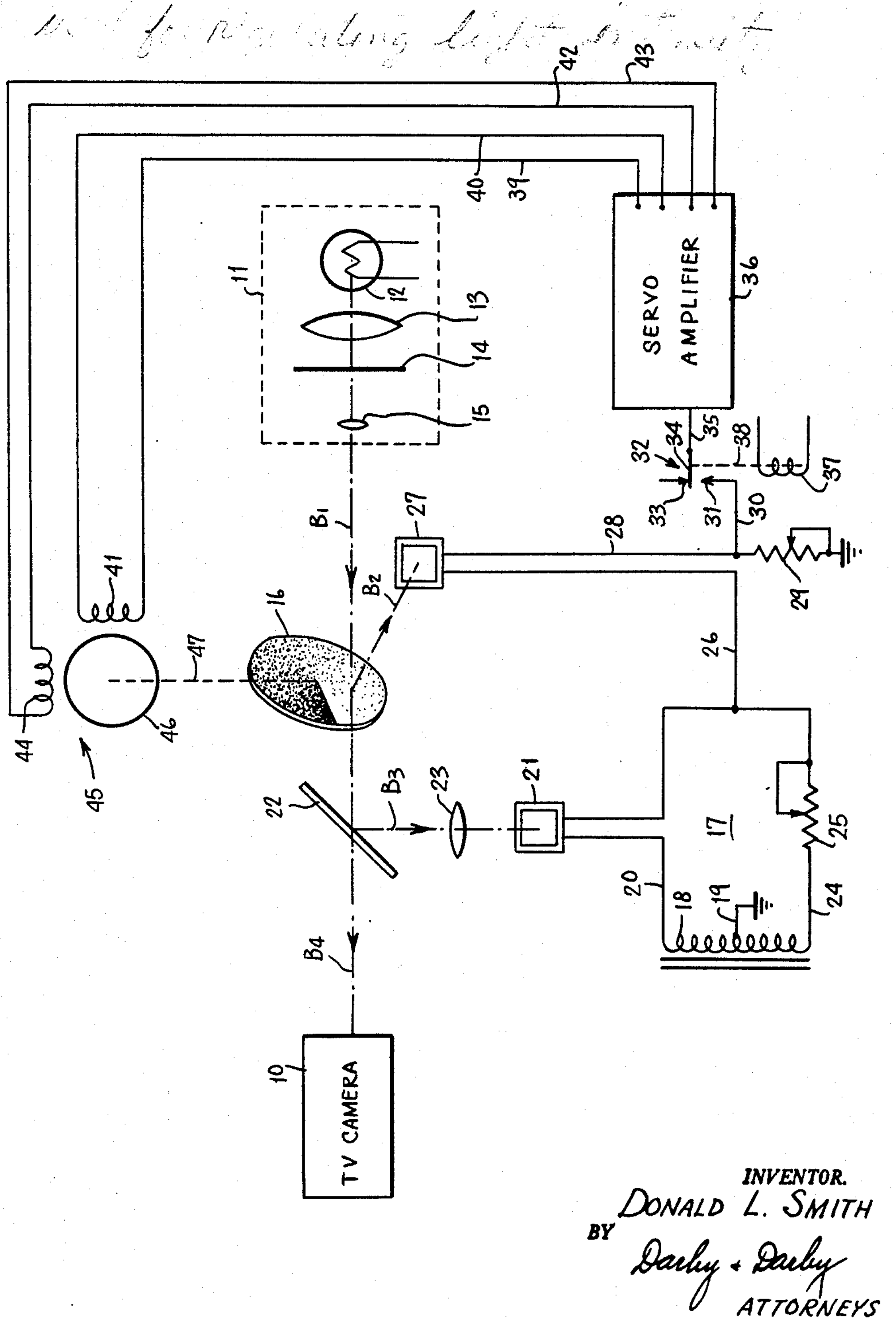
INVENTOR.
DONALD L. SMITH
BY Darby & Darby
ATTORNEYS United States Patent Office 3,010,362
Patented Nov. 28, 1961

3,010,362

AUTOMATIC LIGHT CONTROL

Donald L. Smith, Cincinnati, Ohio, assignor to Crosley Broadcasting Corporation, Cincinnati, Ohio, a corporation of Ohio Filed Dec. 8, 1959, Ser. No. 858,168
1 Claim. (Cl. 88—24)

This invention relates to systems for regulating light intensity and more particularly to an improved light intensity regulating system for use with television film cameras and the like.

In many of the known arrangements for televising motion picture films, the film to be televised is projected directly on the face of the television camera by a film projector. The pictorial information stored on the film is then converted into electrical signals by the television camera and transmitted over the television system in the usual manner. When television cameras of the "vidicon" type, for example, are employed, it becomes desirable to control the intensity of the beam of light from the film projector to insure proper camera operation. If the intensity of the light striking the camera tube is too high, so that the vidicon scanning beam can not discharge the resulting highlights, all definition is lost in these highlights and poor picture transmission results. While the intensity of the television camera scanning beam could be made higher than the highest light intensity encountered, this is not usually done because of the noise problem inherent in high beam intensity operation. Accordingly, the usual practice is to operate the camera scanning beam at low intensities and to maintain the intensity of the light beam from the film projector at a predetermined lower level. A problem arises however, when the film material being televised consists of a series of rapidly changing scenes of alternating high and low light levels. Since successive film scenes may alternate from light to dark and from dark to light very rapidly, it is extremely difficult to provide an automatic light intensity regulating system which operates with sufficient speed to maintain the intensity of the light beam striking the face of the television camera at the desired safe level at all times. Under these circumstances, the rapidly fluctuating light levels from the projector may produce an average light level which exceeds the safe predetermined level and causes poor picture transmission. Since, as explained above, it is the maximum light level from the projector which may exceed the "range" of the television camera, it is desirable that a light intensity regulating system function to reduce the intensity of the light beam from the film projector to a safe low level for the duration of a series of rapidly changing scenes of alternating high and low light levels.

Accordingly, it is an object of this invention to provide an improved light intensity regulating system for television film cameras and the like.

It is a further object of this invention to provide a light intensity regulating system for television film cameras and the like, wherein means are provided for maintaining the intensity of the projected light beam at a safe level for the duration of a series of rapidly changing scenes of alternating high and low light levels.

It is a still further object of this invention to provide a regulating system for maintaining the intensity of output light from an unregulated source of light at predetermined value, wherein means are provided for controlling the sensitivity of the regulating system in response to the intensity of the input light from the unregulated source of light.

Briefly, the light intensity regulating system of the invention comprises a variable neutral density filter disposed between the film projector and the television camera. Error sensing means are provided to sense the deviations in intensity of the projected light striking the face of the camera from a predetermined value representing the desired light intensity, so that the output from the error sensing means constitutes an error signal. Additionally, control means are provided for controlling the density of the variable neutral density filter in response to the error signal from the sensing means, so that the density of the filter is changed in a direction to compensate for the deviations in intensity of the projected light. Provision is also made for varying the sensitivity of the regulating system in response to the intensity of the light beam from the projector. This may be accomplished by sensing a component of the input light reflected from the input side of the variable density filter and employing the sensed information to vary the magnitude of the error signal. By virtue of this arrangement, as the intensity of the input light increases, the magnitude of the error signal is correspondingly increased, so that the sensitivity of the regulating system is increased. Accordingly, the regulating system operates with a greater speed in a direction to reduce the intensity of the projected light than in a direction to increase the intensity of the projected light. Therefore, when the film material being projected consists of a series of scenes of alternating high and low light levels, the regulating system very quickly increases the density of the variable density filter to maintain the intensity of the light beam striking the face of the television camera at a safe value. However, should the intensity of the beam from the projector fall to a low level and remain there for a period of time, the regulating system will slowly decrease the density of the filter to thereby maintain the output light beam at the predetermined intensity.

The single figure of the drawing is a schematic diagram of a light intensity regulating system constituting a preferred embodiment of the invention and suitable for use with television film cameras and the like.

As seen in the drawing, a television camera 10, which may be of the vidicon type, for example, or may even comprise a plurality of multiplexed television cameras, is arranged to pick up the picture projected by a motion picture film projector 11. The projector 11 is of conventional type and consists of the usual light source 12, condenser lens 13, film strip 14, and focusing lens 15. The input light beam $B_1$ from projector 11 is essentially a light beam of varying or unregulated intensity because the passage of the film 14 through the projector varies the intensity of the light from source 12 in accordance with the density of the pictorial subject matter on the film. A variable neutral density filter 16 is interposed between the projector 11 and the television camera 10 to control the intensity of the output light beam $B_4$ striking the face of the television camera. As illustrated, the filter 16 may be a rotatable disc having an angularly varying density, so that rotation of the disc varies the density of the filter intercepting light beam $B_1$. Since filter 16 is a neutral density filter, it functions to vary the intensity of light beam $B_4$ without changing the relative spectral distribution of the energy of the beam. Such filters are often called "gray filters" because they are an achromatic neutral gray having neither hue nor saturation. The optical arrangement and physical placement of film projectors and television cameras are well known and need not be described herein. Suffice it to say that the projected beam $B_1$ is of small area. It will be understood that the single figure of the accompanying drawing is schematic and is proportioned for purposes of clarity in illustration and not in accordance with actual commercial design dimensional relationships. As previously indicated, the purpose of the filter is to vary the intensity of the light beam, and those skilled in the art will fully understand how to place and dimension such a filter with respect to the optics in projector 11.

The error sensing portion of the regulating system comprises a bridge circuit 17 energized by a coil 18 which may be the secondary winding of a transformer, as illustrated. The coil 18 is center-tapped and grounded by a lead 19, so that each half of the coil 18 forms an arm of the sensing bridge. One end of coil 18 is connected by a lead 20 to a photoconductive cell 21 which forms another arm of the bridge 17. The cell 21 has a resistance which varies inversely with the intensity of light falling on the cell and is arranged to receive a component $B_3$ of the output light beam $B_4$ by means of a mirror 22 and a lens 23. By virtue of this arrangement, the circuit resistance of cell 21 is made dependent upon the intensity of the output light beam $B_4$. The other end of coil 18 is connected by a lead 24 to a variable resistance 25 which forms the last arm of the sensing bridge.

As thus far described, it may be seen that the sensing bridge 17 is composed of a first pair of arms formed by photoconductive cell 21 and variable resistance 25 and a second pair of arms formed by the halves of coil 18. Since the resistance of cell 21 is dependent upon the intensity of the output light beam $B_4$, the output signal from the bridge appearing between ground and the circuit junction of cell 21 and resistance 25 is an alternating current error signal of variable amplitude and reversible phase. For example, when the output light beam $B_4$ is at the predetermined level for which resistance 25 is set, the resistance of cell 21 is equal to the resistance of variable resistance 25, so that no error signal appears at the output of the sensing bridge. That is to say, by the selection of design parameters well known to those skilled in the art, the resistance network including the elements 21 and 25 is arranged so that the sensing bridge is in balance. A more intense beam $B_1$ than that present when the bridge is in balance will cause to occur events which will angularly position filter 16 to present a greater-density area to the beam $B_1$. A less intense beam $B_1$ than that present when the bridge is in balance will cause to occur events which will move filter 16 to a position of greater transparency so far as the beam $B_1$ is concerned. As the intensity of the output light beam rises above the predetermined level, an error signal of one phase appears at the bridge output due to the decrease in resistance of cell 21. Similarly, as the intensity of the beam $B_4$ falls below the predetermined level, the resistance of cell 21 increases, so that an error signal of opposite phase appears at the output of bridge 17. Accordingly, the magnitude of the error signal represents the magnitude of the deviation of output beam intensity from the selected value, while the phase of the error signal represents the direction of intensity deviation.

The error signal from the sensing bridge 17 is coupled by a lead 26 to one side of a photoconductive cell 27 which is arranged to receive a component $B_2$ of the light beam $B_1$ reflected from the input side of filter 16. The other side of cell 27 is coupled to ground by a lead 28 and a variable resistance 29. The cell 27 may be of the same type as cell 21, so that its resistance varies inversely with the intensity of the reflected light component $B_2$. By connecting the circuit junction of cell 27 and variable resistance 29 to a lead 30, as illustrated, the cell 27 and resistance 29 function as a variable voltage divider or attenuator to provide a portion of the error signal from the sensing bridge 17 at the lead 30 which varies in response to the intensity of the input light beam $B_1$. For example, when the intensity of beam $B_1$ increases, the intensity of reflected beam $B_2$ increases, so that the resistance of cell 27 decreases and the voltage divider permits a large portion of the error signal to appear at lead 30. Similarly, as the intensity of beam $B_1$ decreases to a lower value, the resistance of cell 27 increases and the voltage divider applies a smaller portion of the error signal to lead 30. By virtue of this arrangement, the attenuation of the error signal, and hence the sensitivity of the regulating system, is determined by the intensity of the light beam $B_1$ from the projector 11. While the reflected component $B_2$ of the input beam $B_1$ is obtained in the illustrated embodiment of the invention by sensing the reflection from the input side of filter 16, it will be understood that other arrangements, such as a mirror, for example, could be utilized.

The lead 30 is connected to a fixed contact 31 of a relay 32. The relay 32 has an unconnected fixed contact 33, so that it functions as a single pole-single throw switch. The movable contact 34 of the relay is coupled by a lead 35 to the input of a servo amplifier 36. The coil 37 of the relay is coupled mechanically to the movable contact 34, as indicated by the dotted line 38, so that application of the error signal from the sensing bridge to the servo amplifier 36 is controlled by the energization of coil 37. Preferably, the coil 37 is connected to the usual running relay (not shown) on the projector 11, so that the regulating system is rendered inoperative when the projector is not in operation. This prevents the regulating system from rotating the filter 16 to its least dense portion when the projector is not running, so that when the projector is again turned on, a light beam of high intensity will not be permitted to reach the face of the television camera 10. When employed in this manner, the relay 32 constitutes a safety feature which may be dispensed with, if desired. The servo amplifier 36 may comprise any of the well known types of servo amplifiers which are employed to drive two-phase servo motors in response to variable amplitude-reversible phase error signals. Basically, the servo amplifier supplies a fixed phase-constant amplitude output to one winding of the servo motor and a reversible phase-variable amplitude output to the other winding of the motor. The two outputs, however, are maintained at a phase difference of 90° to provide motor torque. As illustrated, leads 39 and 40 couple the reversible phase-variable amplitude output of the servo amplifier to a stator winding 41 on a two-phase induction servo motor 45, while leads 42 and 43 couple the fixed phase-constant amplitude output of the amplifier to a stator winding 44 of the servo motor. The servo motor 45 has a rotor 46 which is coupled mechanically to the variable density filter 16 as indicated schematically by the dotted line 47. In operation, the two-phase induction motor 45 functions in the usual manner to provide an output torque which is a function of the product of the amplitudes of the signals applied to windings 41 and 44. The direction of rotation of the motor is determined by the phase of the signal applied to the variable winding 41 with respect to the fixed phase signal applied to winding 44. Accordingly, the direction of rotation of motor 45 is determined by the phase of the error signal from bridge 17, while the torque, and consequently the acceleration of the motor is determined by the amplitude of the error signal.

In practice, the variable neutral density filter 16, the servo amplifier 36 and the servo motor 45 may comprise an R.C.A. type M1–26595 light control, for example. Similarly, each of the light-responsive cells 21 and 27 could be a cadmium sulphide type of photoconductive cell. With this type of cell and a voltage of 6.3 volts across the coil 18, the values in ohms of the variable resistances 25 and 29 may be 25K and 100K respectively. It should be pointed out that a single supply voltage source must be utilized for both the sensing bridge 17 and the servo amplifier 36, so that the frequency of the supply voltage to each unit will be the same and will have a fixed phase relationship. Finally, it may be noted that the light component $B_3$ produced by mirror 22 may constitute approximately 3% of the output light beam $B_4$.

In describing the operation of the light intensity regulating system of the invention, it may be assumed initially that the intensity of output light beam $B_4$ is at the desired level, so that the sensing bridge 17 is balanced and no error signal appears at lead 26. Assume also that input light beam $B_1$ from the projector 11 is at a low level of intensity, so that the filter 16 represents a portion of lesser density to the light beam. Since the reflected beam of light $B_2$ is also of low intensity, the resistance of cell 27 will be correspondingly high, so that the voltage divider formed by the cell 27 and the resistance 29 is set to pass a small portion of any error signal which may appear to the input of servo amplifier 36. Under these conditions, should the light intensity of input beam $B_1$ from the projector suddenly rise to a higher level, the intensity of output light beam $B_4$ will also tend to rise and in so doing will unbalance the bridge 17 and produce an error signal at the lead 26. The amplitude of this error signal will, of course, be determined by the amount of the deviation of the controlled light beam $B_4$ from the set value, while the phase of the error signal will be determined by the direction of the deviation. This error signal is then passed through the voltage divider formed by cell 27 and resistance 29. Since the intensity of light beam $B_1$ has increased, the resistance of cell 27 has decreased and the voltage divider passes a large portion of the error signal to amplifier 36. Servo amplifier 36 then applies the error signal to the stator winding 41 of servo motor 45, which quickly rotates the filter 16 to a portion of greater density. When the filter 16 is rotated to the portion of correct density to reduce the output light beam $B_4$ to the selected level, the error signal from the sensing bridge again falls to zero and the servo motor is stopped. Since the voltage divider sensitivity control applied a large portion of the error signal to the servo motor 45, the motor torque, and hence the acceleration of the filter 16 was large, and the change from the low density portion to the high density portion made with great speed. Assuming next, that the light beam $B_1$ from the projector decrease in intensity, the output light beam $B_4$ also decreases in intensity and unbalances the sensing bridge in the opposite direction, to thereby produce an error signal of opposite phase at the lead 26. Since the intensity of light beam $B_1$ is reduced, the resistance of cell 27 is increased and the voltage divider permits a smaller portion of the error signal to appear at lead 30, so that the servo motor 45 is driven in the opposite direction with a reduced torque. Therefore, the filter is rotated to a more transparent portion with a lesser speed, to again restore the intensity of the output light beam $B_4$ to the set value.

From the foregoing description of the operation of the regulating system of the invention, it may be seen that the sensitivity of the regulating system is controlled in accordance with the intensity of input light beam $B_1$, so that the sensitivity increases with light intensity. This characteristic is extremely important for the televising of films which may have a series of rapidly changing scenes of alternating light and dark intensity levels. As explained previously, the response time of the regulating system is such that the regulating system may have difficulty in following the changes in light intensity caused by the rapidly changing scenes, so that the average intensity of the output light beam may reach an unsafe level. Because of the variable sensitivity feature, however, the regulating system is more sensitive at higher intensity levels and therefore quickly rotates the filter 16 to its most dense portion during a series of rapidly changing scenes. Since the average intensity of input beam $B_1$ is low during such a series of scene changes, the sensitivity of the system is reduced and the filter 16 is maintained at its denser portions for the duration of the series of scenes. Of course, should the intensity of the input light beam $B_1$ fall to a low level and stay there for a period of time, the filter will be rotated slowly to its more transparent portions, so that the television camera receives the proper light input.

It is believed apparent that many changes could be made in the above-described light intensity regulating system and many seemingly different embodiments of the invention constructed without departing from the scope thereof. For example, different types of servo amplifiers and motors could be employed in place of the types illustrated. Furthermore, different types of variable density filters and light responsive cells could be employed in place of the filter 16 and the cells 21 and 27 without altering the basic construction and operation of the system. Accordingly, it is intended that all matter contained in the above description or shown in the accompanying drawing shall be interpreted as illustrative and not in a limiting sense.

What is claimed is:

A device for use with a conventional television camera for stabilizing the intensity of a light beam entering said camera, comprising: a film projector including a light source and an optical system for projecting a beam of light through a moving film onto said camera, changes in film scenes from light to dark and dark to light tending to produce corresponding changes in the intensity of said light beam as it leaves said projector, and means for sensing those changes and introducing compensatory changes in the intensity of said light beam as it enters said camera, said means comprising:

a graded density filter interposed between said projector and said camera and rotatably mounted in the path of said beam to decrease its transparency to said beam as it rotates in one direction and to increase its transparency as it rotates in the opposite direction;

a mirror interposed between said filter and said camera and mounted at an angle in the path of said beam to transmit a first part of said beam to said camera and to reflect a second part of said beam laterally;

an electrical resistance bridge network including as one of its arms a photocell on which said second part of said beam is cast;

said bridge network being balanced at some value of intensity of said beam;

said bridge network being unbalanced by a change in the intensity of said beam to produce an output error signal, the magnitude and phase of which depend upon the deviation of the intensity of the beam, as projected by the projector, from said value;

a servo system responsive to said error signal angularly to displace the filter in the direction of decreased transparency when said beam intensity deviation is an increment and of increased transparency when the beam intensity deviation is a decrement, in order to stabilize the intensity of the part of the beam entering said camera;

a third part of said beam being reflected from said filter;

and a photocell-type attenuator exposed to said third part and electrically interposed between said bridge network and said servo system to attenuate the error signal by an amount depending on the intensity of the beam reflected from said filter.

References Cited in the file of this patent

UNITED STATES PATENTS

| | | |
|---|---|---|
| 1,930,137 | Twyman | Oct. 10, 1933 |
| 1,934,484 | Camilli | Nov. 7, 1933 |
| 1,946,612 | Carter | Feb. 13, 1934 |
| 2,050,412 | Barthelemy | Aug. 11, 1936 |
| 2,133,882 | Zworykin | Oct. 18, 1938 |
| 2,417,506 | Lamb | Mar. 18, 1947 |
| 2,431,824 | Poch | Dec. 2, 1947 |
| 2,464,162 | Tuttle et al. | Mar. 8, 1949 |
| 2,835,165 | Smith | May 20, 1958 |
| 2,939,361 | Hock | June 7, 1960 |
| 2,952,188 | Bang | Sept. 13, 1960 |